Figure 1:
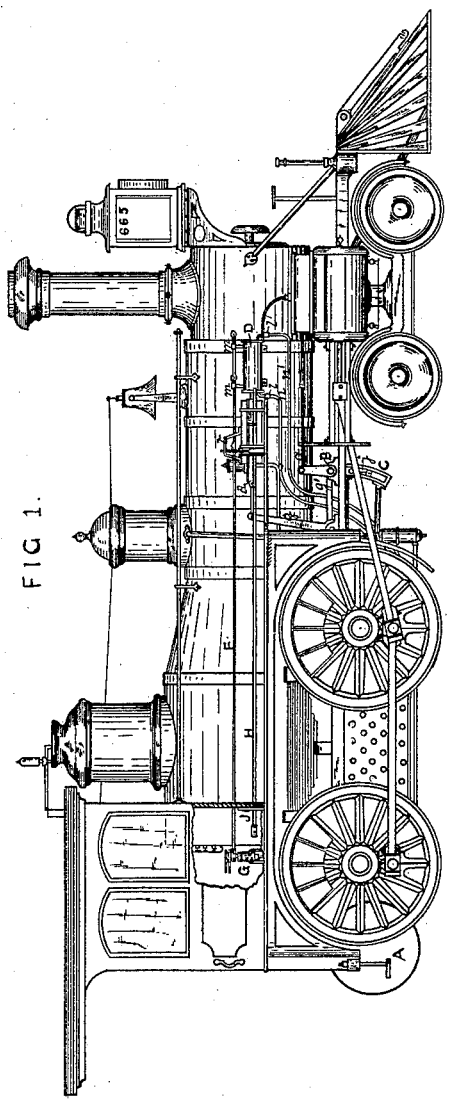

(No Model.) 2 Sheets—Sheet 1.

R. A. JOHNSTON & J. H. CROSBY.
REVERSING VALVE GEAR FOR ENGINES.

No. 303,644. Patented Aug. 19, 1884.

Witnesses
N. B. Corwin
R. C. Golden

Inventors
Robert A. Johnston
John H. Crosby
by their attorneys
Bakewell & Kerr

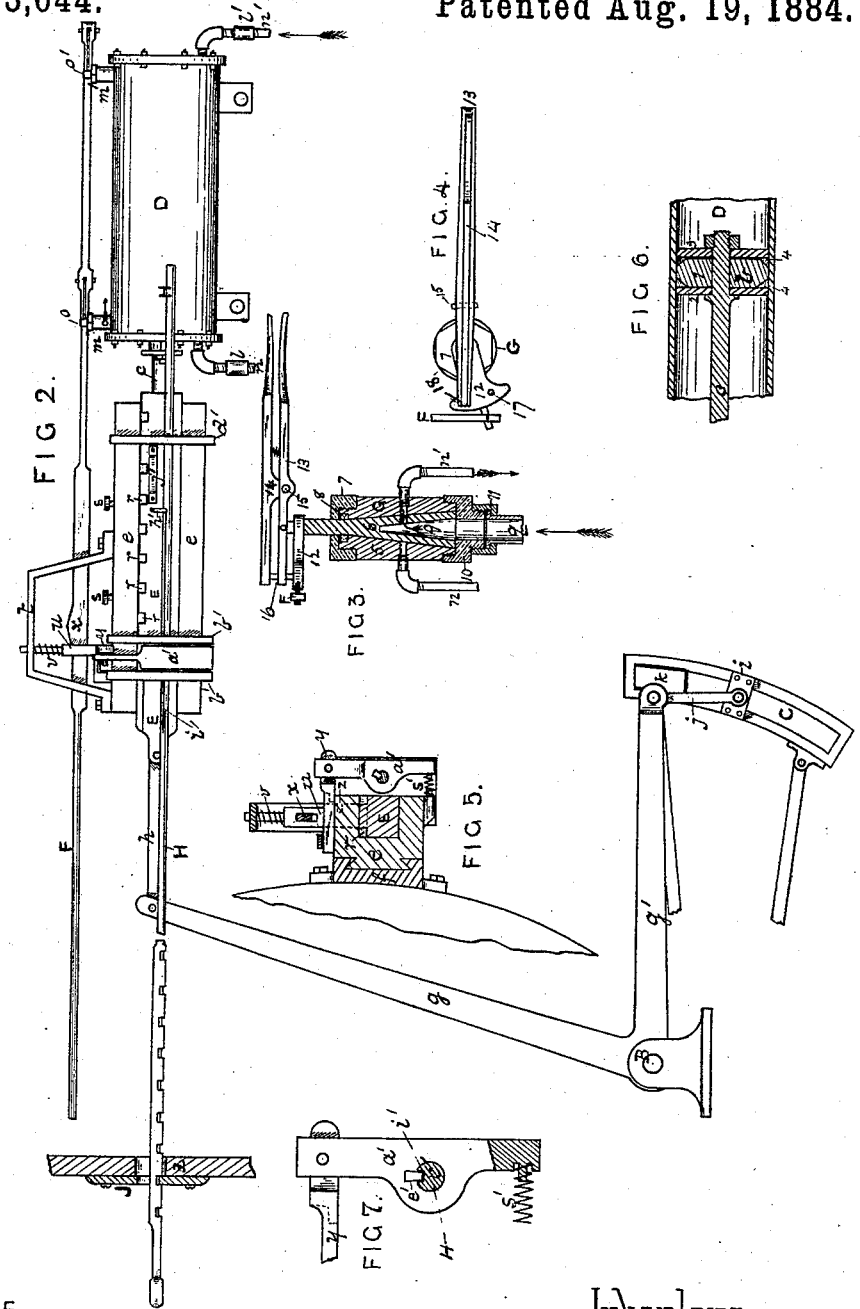

UNITED STATES PATENT OFFICE.

ROBERT A. JOHNSTON AND JOHN H. CROSBY, OF ALLEGHENY, PA.

REVERSING VALVE-GEAR FOR ENGINES.

SPECIFICATION forming part of Letters Patent No. 303,644, dated August 19, 1884.

Application filed December 15, 1883. (No model.)

*To all whom it may concern:*

Be it known that we, ROBERT A. JOHNSTON and JOHN H. CROSBY, of Allegheny City, in the county of Allegheny and State of Pennsylvania, have invented a new and useful Improvement in Reversing Valve-Gear for Steam-Engines; and we do hereby declare the following to be a full, clear, and exact description thereof.

Our invention consists in the application to the reversing link and lever of a locomotive-engine of an auxiliary engine to be worked by compressed air or steam, and in the construction and operation of devices connected therewith, whereby the auxiliary engine may be caused either to reverse the engine or to cut off steam at any point in the stroke at the will of the engineer.

In the accompanying drawings we have shown our improvement as applied to ordinary construction of locomotives used on railroads; but it is applicable, with obvious modifications of arrangement, to all similar steam-engines.

In the accompanying drawings, Figure 1 is a side view of a locomotive-engine with our improvement attached. Fig. 2 is a side view of an auxiliary engine, on a larger scale, showing its connection with the reversing-shaft which operates the reversing-links. Figs. 3 to 7 are representations of details of the apparatus.

In the several figures like letters of reference indicate the same parts.

In Fig. 1, A is a reservoir of compressed air—such as is used in an air-brake apparatus—into which air is forced by means of an air-pump operated by a special steam-engine, or by connection of the pump with a crank on the axle of one of the driving-wheels of the locomotive in the manner ordinarily practiced in locomotives furnished with air-brake apparatus. When such apparatus is used, the same air-reservoir will serve to operate our reversing-engine and the air-brakes.

B is the reversing-shaft, and C the link, which are of ordinary and well-known construction, and are connected with the slide-valve rod $a$ of the steam-engine in the usual manner.

D is the cylinder of our reversing-engine, which may be supported by brackets at the side of the locomotive-boiler in any convenient position.

In the cylinder D is a piston, $b$, (see Fig. 6,) attached to a piston-rod, $c$, which extends backward to and is rigidly connected with the rack E, which is a rod or plate rectangular in cross-section, which slides in a box, $e$, closed on three sides and open in front. It is dovetailed on its inner side, as shown in Fig. 5, and is attached to the side of the locomotive by being slid into flanges $f$, having dovetailed recess and bolted to the boiler. The rack E is connected with the upper end of the arm $g$ of the reversing-shaft by the reach-rod $h$. The horizontal arm $g'$ of the reversing-shaft B is connected with the link-saddle $i$ of the link C by the hanger $j$, and the sliding block $k$ of the link is pivoted to the rocking arm, which operates the valve-rod $a$ of the steam-engine in the usual way. With this construction it will be evident that the movement of the piston-rod of the air-cylinder D in either direction will operate the arm $g'$ of the reversing-shaft, and thereby shift the link C up or down, so as to reverse the engine in like manner as is ordinarily done by means of the reversing-lever when operated by hand; but it is necessary that the link should be susceptible of a regulated partial movement, so as to cut off the steam at any desired point of the stroke, so as to work the engine with variable expansion, and by means of our apparatus we are enabled to do this with great ease and nicety of adjustment.

The air-cylinder D is supplied with compressed air from the reservoir A by means of two pipes, $n\ n'$, the former entering the front end and the latter the rear end of cylinder D. Each of these pipes $n\ n'$ is furnished with a check-valve, $l\ l'$, located near the cylinder. These check-valves open toward the cylinder only, so that while they admit the compressed air freely they prevent its return through these pipes.

At each end of cylinder D is an exhaust-port, $m\ m'$, furnished with plug-cocks $o\ o'$, having short arms, which are pivoted to the shifting-rod F, as shown in Fig. 2. The single exhaust-port in each of these cocks is so situate relatively to the other that when one exhaust-port, $m$, is opened the exhaust-port $m'$ at the other end of the cylinder is closed, and when the short arms of the plug-cocks $o\ o'$ stand at right angles to the axis of the cylinder D both of the exhaust-ports are closed. Thus when the shifting-rod is moved backward the rear exhaust-port $m$ is opened. The compressed air in the rear end of the cylinder will then escape, and the compressed air entering the pipe $n'$ at the forward end will push back the piston $b$, and with it the rack E and reach-rod $h$, forcing back the arm $g$ of the reversing-shaft and operate the link, and this will take place at whatever position the piston may be in the cylinder when the air is exhausted from one end and admitted at the other. The motion of the piston will also be arrested by moving the shifting-rod in the opposite direction. The arresting of the piston at any desired point may be effected by closing both of the exhaust-ports, when, the air-pressure at both sides of the piston being equal, the piston will come to rest. It is not necessary, however, to close the exhaust-ports in order to arrest the motion of the piston, as when the latch $u$ drops into one of the notches in the rack E the piston must stop. This leaves the compressed air at one end of the cylinder, so that whenever the latch is raised, if the rod H has been set to another notch, the piston will move again until the latch is again released.

It is important that the piston of the air-cylinder, which should be air-tight, should be so packed that the packing will not easily wear so as to become leaky. For this purpose we construct the piston as shown in Fig. 6, in which 1 is the plug of the piston. 2 3 are followers placed one at each end of the piston. The circumference of the piston is slightly beveled on both faces, so as to leave a cavity (triangular in cross-section) bounded by the follower, the side of the piston, and the surface of the cylinder. This is filled on both sides of the piston with anti-friction or other suitable packing, 4.

The rear end of the shifting-rod E extends to the cab of the locomotive, and is there connected with a three-way cock, G, for controlling the admission of compressed air to the cylinder D through the pipes $n\ n'$. This cock G is shown in section and on an enlarged scale in Fig. 6. The body or case 5 of the cock has a conical cavity tapering upward, in which fits a correspondingly-shaped plug, 6, which turns on its axis within the case. The upper end or stem of the plug 6 extends above the top of the case 5, and a cap, 7, is screwed onto the top of the case over a cavity, 8, around the stem of the plug 6, in which cavity packing is inserted with a washer over the packing which is compressed by the washer and cap. The plug 6 has a tapering cavity, 9, the lower end of which coincides with the internal diameter of the pipe $q$, which communicates directly with the air-reservoir A, and a screw-cap, 10, on the lower end of case 5 presses the plug 6 up into its seat. The end of the pipe $q$ is flanged, and it is coupled to the screw-cap 10 at the lower end of the case 5 of the cock G by a ferrule, 11, which is screwed onto the cap 10, the flange of the pipe being inside of the ferrule. The pipes $n\ n'$ are screwed into the case 5 of the cock, so as to communicate with two ports on opposite sides of the case, which enter the cavity of the case. The plug 6 has only one port, (indicated by the arrow in Fig. 3,) through which compressed air from the reservoir A passes to whichever of the pipes $n$ or $n'$ is connected, by one of the ports of the case 5, with the single port of the plug 6.

Near the upper end of the spindle of the plug 6 of the cock G is a small sector-plate, 12, which is pivoted to the spindle 6, so as to turn thereon without turning the plug of the cock G, and to the periphery of the sector-plate 12 is attached the extremity of the shifting-rod F.

Above the sector-plate 12, on top of the plug 6 of the cock, is fastened the handle 13, so that by turning the handle 13 the plug 6 of the cock G is turned to admit compressed air to the cylinder D, or to shut it off. The forward end of the handle 13 extends beyond the plug 6 to the periphery of the sector-plate 12, as shown in Figs. 3 and 4. A lever, 14, is pivoted at 15 to the upper side of the handle 13, a small spring keeping the forward end of the lever 14 depressed, so as to press a pin, 16, attached to the end of the lever 14, into one of two holes, 17, bored in the upper face of the sector-plate 12. By this arrangement it will be seen that if the pin 16 enters one of the holes 17 or 18 in the sector-plate the shifting-rod F becomes so connected with the handle 13 and plug 6 that when the handle 13 is turned both the shifting-rod F, which operates the exhaust ports $m\ m'$ of the cylinder D, and the cock G are acted upon at the same time. If, however, the handle of the lever 14 is depressed so as to raise the pin 16 out of the hole in the sector-plate 12, the handle 13 may be turned so as to turn the plug 6 without moving the shifting-rod until the pin 16 enters the other hole in the face of the sector-plate. The object of this arrangement is to enable the handle 13, and with it the plug of the cock G, to be turned without raising the latch which holds the piston-rod of the cylinder from moving, as hereinafter described. If, after the handle 13 has been turned with the pin 16 in the hole 18 of the sector-plate, so as to admit air through the cock G to the cylinder, the handle 13 is then turned a little farther in the same direction, (the pin 16 still engaging the sector-plate,) the air will be shut off from the cylinder. If, now, it is desired to reverse the engine, (the rod H being properly set,) the pin 16 is released from the hole 18 in the sector-plate, and the handle 13 is moved back (moving the plug 6, but not the shifting-rod F) until the pin 16 engages the hole 17. The plug 6 and sector-plate 12 are then turned by the handle 13 until the air is let into the cylinder, after which the air may be again shut off by moving the handle, and with it the sector-plate a little farther in the same direction.

By means of the apparatus already described the engine may be reversed by moving the shifting-rod, as already described, the piston in all cases completing its stroke by the force of the compressed air admitted at one end and permitted to escape at the other end; but in order to set the link C in such position as to act as a cut-off, and work the steam expansively, it is necessary to be able to arrest the piston at any point in its stroke at the will of the engineer. We will therefore proceed to describe the devices by which this is effected.

As already described, the piston-rod $b$ is connected with a rack-bar, E, which has notches $r$ cut in its upper face at right angles to the length of the bar. The upper face of the rack-bar E has a longitudinal groove. Two or more screws, $s\ s$, are passed through the top piece of the box $e$, in which the rack E slides, until their lower extremities enter the groove referred to. This serves to keep the rack E in place and steadies its motion.

On top of the box $e$, near its rear end, is an arched bracket, $t$, which receives the upper end of a latch, $u$. The lower end of the latch is broad, and has a rounded edge, which enters one of the notches in the top of the rack E, the latch passing through a slot in the top of the box $e$. A spiral spring, $v$, serves to keep the latch depressed, but permits it to be raised.

In Fig. 2 a side view of the latch is given, and a front view in Fig. 5. A slot, $w$, is made through the latch, through which the shifting-rod F passes. That part of the shifting-rod which passes through the slot $w$ in the latch is made rectangular, as shown in Fig. 2, and has a double incline, $x$, on its upper side, so that when that part of the shifting-rod F passes through the slot $w$ the latch is raised sufficiently to clear the grooves in the rack, which leaves the piston-rod $b$ and rack E free to move. When the latch $u$ is thus raised, a spring-catch, $y$, passes into a notch, $z$, in its side, and holds it in the elevated position.

The spring-catch $y$ is shown in Fig. 5, in which the notch $z$ is represented by dotted lines. The spring-catch $y$ is pivoted to the upper end of a block, $a'$, and a spiral spring, $s'$, causes the catch $y$ to engage the latch $u$ whenever it is raised. The block $a'$ of the catch $y$ is held in place by two side pieces, $b'\ b'$, fastened to the box $e$ of the rack E, and by a rod, H, which passes through a round hole, $c'$, in the block $a'$. The rod H extends longitudinally alongside of the piston $b$ and rack E, and extends backward to the cab of the locomotive. This rod H serves to regulate the length of the stroke of the piston of the air-cylinder D, and is set by the engineer, it being susceptible of longitudinal adjustment, being supported by brackets $d'\ d'$, fixed to the cab of the locomotive and to the box $e$ of the rack. That portion of the rod H which passes through the block $a'$ of the spring-catch $y$ has a groove, $i'$, (shown in Fig. 7, which is an enlarged representation of part of Fig. 5,) which groove extends along so much of the rod H as passes through the block $a'$. The hole $c'$ in block $a'$ has a spline, $e'$, which projects into the groove $i'$, so that when the rod H is turned on its axis the block $a'$ turns with it, thus withdrawing the spring-catch $y$ from its engagement with the notch $z$ in the latch $u$. The turning of the rod H on its axis at the proper time to drop the latch $u$ into one of the notches of the rack E is effected by means of a pin, $h'$, on the rod H, and a cam, $j'$, on the side of the rack E. This cam and pin are so placed relatively to each other as that when the piston-rod $b$ has completed its stroke (if the engine is to be reversed) or has completed so much of a stroke as to cut off the steam at the desired point, the cam $j$ will pass under the pin $h$, pushing it to one side and forcing the rod H to turn on its axis, which, as just described, releases the latch $u$, which then engages one of the notches $r$ in the rack and arrests the further motion of the piston. The rear end of the rod H, which enters the cab of the locomotive, has a series of notches, corresponding exactly in number and distance from center to center with the notches in the rack E, so that by drawing out or pushing back the rod H through the bracket or frame J in the cab, which supports the rear end of the rod H, (see Fig. 2,) the number of notches which appear in front of the bracket will indicate what length of stroke the piston will be permitted to make, or, in other words, at what point in the stroke the steam will be cut off. For example, if there are eight notches in the rod H, each notch will represent one-eighth of the entire stroke of the piston.

When the parts of the apparatus are in the position shown in Fig. 2, the piston of the cylinder D is at the end of its forward stroke, the port $m$ is closed, and the port $m'$ is open. If, now, the handle 13 of the cock G be turned to the position shown in Fig. 3, the shifting-rod will be drawn back and the valves of the ports $m$ and $m'$ will be shifted, so as to open the exhaust-port $m$ and close $m'$, and compressed air will pass from the air-reservoir A, through the pipe $n'$, into the forward end of the cylinder D. The rod H having been set, as shown in Fig. 2, when the shifting-rod F is drawn backward by turning the handle 13, as just stated, the latch $u$ will be raised, setting the piston free to move backward in the cylinder D until the cam $j$ passes under the pin $h$ on the rod H, which turns the rod H on its axis and releases the latch $u$, (which had been held up by the spring-catch $y$ as soon as the latch $u$ was raised.) The latch $u$, then being pressed down upon the upper surface of the rack E, enters the first notch in the rack which it encounters. This at once arrests the motion of the piston-rod $b$, and the apparatus comes to rest, the link C having been raised a short distance. If it is desired to reverse the engine, the rod H is set at the last notch, which sets the pin $h'$ in such relative position to the notches on the rack E that the piston will have nearly completed its stroke when the cam $j$ comes in contact with it, releasing the latch and arresting the further motion of the piston of the cylinder D.

Our invention, although described particularly in its application to a locomotive, is equally applicable to steamboats, and may also be used to advantage in connection with steam-engines used for other purposes.

As before stated, the auxiliary engine herein described may be used in like manner for operating the link-motions of steam-engines, when such auxiliary engine is operated by steam, in which case the pipes $n$ $n'$ will connect with the steam-boiler and cylinder D of the auxiliary engine through the cock G.

It will be evident that the use of the entire apparatus which we have described will not be absolutely necessary, as the chief object which we have in view (the dispensing with the use of an ordinary reversing-lever in the cab of the locomotive) may be accomplished by the use of the auxiliary engine and its connections with the link-motion, the auxiliary engine being operated from the cab of the locomotive by means of the cock G. The exhaust-ports of the cylinder in that case may be operated from the cab by means of a rod or cord or other simple device.

The devices for stopping the auxiliary engine at any desired point of its stroke and for setting the apparatus so that it will shift the link only so far as may be desired, however, add greatly to the efficiency and utility of our apparatus.

Having thus described our invention, what we claim as our invention, and desire to secure by Letters Patent, is—

1. In combination with the link-motion devices of a steam-engine, an air or steam cylinder, and its piston connnected with one arm of the reversing-shaft, and pipes connecting the air-reservoir or steam-generator with the cylinder, a cock or valve for regulating the admission of steam or air to the cylinder, and a shifting-rod for opening and closing the escape-ports of the cylinder, for the purpose of operating the link-motion of steam-engines, substantially as described.

2. The combination, with an auxiliary steam or compressed-air engine for operating the link-motion of a steam-engine, of the rack E, attached to the piston-rod of the auxiliary engine, and latch $u$, for arresting the motion of the piston at any desired point of its stroke, with devices for setting and releasing the latch, substantially as described.

3. In combination with an auxiliary steam or compressed-air engine for operating the link-motion of a steam-engine, a rack attached to the piston-rod of such auxiliary engine, and latch or equivalent device for arresting its motion at any point of its stroke, with the rod H, spring-catch $y$, cam $j$, and pin $h'$, for setting the apparatus so as to arrest the piston at any desired point of its stroke, substantially as described.

4. In combination with a cock for regulating the admission of steam or air to the cylinder of an engine, and a shifting-rod for opening or closing the escape-ports of such cylinder, the sector-plate 12, handle 13, and lever 14, constructed and arranged substantially as and for the purpose set forth.

In testimony whereof we have hereunto set our hands this 8th day of December, A. D. 1883.

ROBERT A. JOHNSTON.
   JOHN H. CROSBY.

Witnesses:
 P. B. WILLOUGHBY,
 A. C. HENRY.